(12) United States Patent
Cowan (10) Patent No.: US 7,696,133 B2
(45) Date of Patent: Apr. 13, 2010

(54) GEOSYNTHETIC COMPOSITE FOR BOREHOLE STRENGTHENING

(75) Inventor: Kenneth Michael Cowan, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 1088 days.

(21) Appl. No.: 11/143,041

(22) Filed: Jun. 2, 2005

(65) Prior Publication Data

US 2006/0276348 A1 Dec. 7, 2006

(51) Int. Cl.
*C90K 8/528* (2006.01)

(52) U.S. Cl. .................. 507/224; 524/487; 507/100

(58) Field of Classification Search .............. 507/224, 507/100
See application file for complete search history.

(56) References Cited

U.S. PATENT DOCUMENTS

| | | | | |
|---|---|---|---|---|
| 3,307,967 A * | 3/1967 | Vanderbilt et al. | ........... | 428/429 |
| 3,536,137 A | 10/1970 | Walther | ............... | 166/295 |
| 3,759,327 A | 9/1973 | Carnes | ................ | 166/295 |
| 3,950,238 A | 4/1976 | Eldred | ................ | 204/159.15 |
| 4,042,032 A | 8/1977 | Anderson et al. | ........... | 166/276 |
| 4,355,122 A | 10/1982 | Fan | .................... | 523/423 |
| 4,404,107 A * | 9/1983 | Cowan et al. | ................. | 507/104 |
| 4,427,069 A | 1/1984 | Friedman et al. | ........... | 166/295 |
| 4,482,015 A | 11/1984 | Falk | .................... | 166/288 |
| 4,538,221 A | 8/1985 | Crain et al. | ................ | 364/172 |
| 4,556,109 A | 12/1985 | Eilers | ................ | 166/295 |
| 4,649,998 A | 3/1987 | Friedman | ................ | 166/294 |
| 4,669,543 A | 6/1987 | Young | ................ | 166/276 |
| 4,721,160 A | 1/1988 | Parcevaux et al. | ........... | 166/293 |
| 4,936,385 A | 6/1990 | Weaver et al. | ............. | 166/288 |
| 5,101,900 A | 4/1992 | Dees | .................... | 166/250 |
| 5,145,013 A | 9/1992 | Dees et al. | ................. | 166/295 |
| 5,154,230 A | 10/1992 | Dees | .................... | 166/277 |
| 5,159,980 A | 11/1992 | Onan et al. | ................ | 166/294 |
| 5,178,218 A | 1/1993 | Dees | .................... | 166/281 |
| 5,201,612 A | 4/1993 | Gadelle et al. | ............. | 405/264 |
| 5,258,072 A | 11/1993 | Gopalkirshnan et al. | .... | 106/802 |
| 5,343,941 A | 9/1994 | Raybon | ................ | 166/53 |
| 5,443,123 A | 8/1995 | Wall et al. | ................. | 166/288 |
| 5,488,991 A | 2/1996 | Cowan et al. | ................ | 166/293 |
| 5,849,674 A | 12/1998 | Fox et al. | ................... | 507/140 |
| 6,034,160 A | 3/2000 | Eaton et al. | ................. | 524/376 |
| 6,177,483 B1 | 1/2001 | Tehrani et al. | .............. | 523/130 |
| 6,562,762 B2 | 5/2003 | Cowan et al. | ............... | 507/110 |
| 7,048,067 B1 | 5/2006 | Cook et al. | ................. | 166/390 |
| 2001/0032723 A1 | 10/2001 | Chatterji et al. | ............ | 166/295 |
| 2003/0092582 A1 | 5/2003 | Reddy et al. | ................ | 507/100 |
| 2003/0100659 A1 * | 5/2003 | Tasaka et al. | ............... | 524/487 |
| 2003/0107217 A1 | 6/2003 | Daigle et al. | ................ | 285/355 |
| 2004/0129459 A1 * | 7/2004 | Guichard et al. | ............. | 175/65 |
| 2005/0269080 A1 | 12/2005 | Cowan | .................. | 166/250.14 |
| 2005/0269085 A1 | 12/2005 | Cowan | ..................... | 166/276 |
| 2005/0284666 A1 | 12/2005 | Cowan | ......................... | 175/65 |
| 2006/0276348 A1 | 12/2006 | Cowan | ......................... | 507/224 |
| 2008/0017377 A1 | 1/2008 | Cowan | ....................... | 166/292 |

FOREIGN PATENT DOCUMENTS

| | | |
|---|---|---|
| DE | 2624715 | 12/1977 |
| EP | 0462880 A1 | 11/1991 |
| EP | 0476820 A2 | 3/1992 |
| EP | 520839 A1 | 6/1992 |
| WO | 94/12445 | 6/1994 |
| WO | 97/15746 | 5/1997 |

OTHER PUBLICATIONS

TH2461PCT—PCT/US2005/019329 Written Opinion, filing date Feb. 6, 2005, Authorized Officer M. Pollio.
TH2461PCT—PCT/US2005/019329 International Search Report, filing date Feb. 6, 2005, Authorized Officer Jose-Antonio Murillo.
International Search Report dated Sep. 21, 2005.
Written Opinion dated Jun. 3, 2004.

* cited by examiner

*Primary Examiner*—Timothy J. Kugel
*Assistant Examiner*—Atnaf Admasu (57) ABSTRACT

Disclosed is a composition comprising a chemical formulation useful for creating geosynthetic composites in-situ, which includes a reactive ester having at least one carbon-carbon double bond, preferably a vinyl ester of a $C_9$ to $C_{11}$ versatic acid or vinyl ester of a long chain fatty acid, or a combination thereof, at least one unsaturated thermoplastic elastomer soluble in the reactive ester; at least one di- or tri-functional acrylate or methacrylate monomer. The formulation may further include a non-aqueous drilling fluid.

50 Claims, 2 Drawing Sheets

FIG.1

GEOSYNTHETIC COMPOSITE FOR BOREHOLE STRENGTHENING

FIELD OF THE INVENTION

This invention is related to borehole lining treatment technology. More particularly it is related to chemical formulations for creating geosynthetic composites in-situ for strengthening and reinforcing. Still more particularly it is related to chemical formulations for creating geosynthetic composites in-situ that are soluble in one or more non-aqueous or invert emulsion drilling fluids, or drilling fluids made with diesel and mineral oils, and blends of any of said drilling fluids with $C_7$ to $C_{20}$ olefins, esters, and paraffinic oils. Additionally the properties of the formulations can be varied by simply altering the concentration of crosslinking monomer and/or solvent.

BACKGROUND OF THE INVENTION

Boreholes created into the earth for extraction of mineral deposits such as oil and natural gas pass through numerous and varied geologic formations. These geologic formations have varied chemical compositions, permeabilities, porosities, pore fluids, internal (pore) pressures, and material properties. Important material properties that significantly impact well construction operations include compressive strength, tensile strength, fracture initiation pressure, fracture propagation pressure, porosity, Young's (elastic) modulus, Poisson ratio and bulk modulus.

Wide contrasts in formation pressures, formation material properties, and formation fluid types often require isolation and treatment of certain geologic formations. Isolation and treatment may be required to treat a weak formation, to increase near-wellbore fracture initiation pressure, to consolidate weak zones, to cure lost circulation, to reduce formation permeability, to seal off flow zones, to isolate high/low pressure zones, to shut off undesirable water or gas supply, to address damage to the tubing caused by collapse in formation and subsequent damage to pipes, or as a shut off plug for wells which are to be shut off permanently or temporarily, or as a so-called "kick-off" plug to prepare a site for the drilling of a new well from the remaining upper section of a former well. Also, in the drilling of multiple branched wells there is often a need to reinforce and seal the transition zones of the surrounding formation. These transition zones are subject to large mechanical stresses. In addition, there may be weak formations in wells that have been drilled such that they deviate substantially from a vertical position, or where part of the well is horizontal.

Weak formations may result where, for example, the fracture initiation pressure of one formation may be lower than the internal pore pressure of another formation. The increased pressure in a borehole created by penetrating one formation may cause a lower strength formation to fracture. Similarly, the fluid pressure gradient in a borehole required to contain formation pore pressure during drilling may exceed the fracture pressure of another, weaker formation exposed in a borehole.

Attempts may be made to isolate specific formations and reinforce them with steel casing, or with cement or other treatments known in the art. Where steel casings are cemented in a borehole to isolate geologic formations having significantly different properties, each of these casing strings is costly and results in a reduction in the diameter of the borehole in subsequent sections as the borehole is deepened. It is desirable, therefore, to minimize the number of casing strings required to reach the desired depth.

It is known in the art to use cement to line boreholes, however a disadvantage of cement is that the curing step may require up to 24 hours, which is a disproportionately long period of time to wait, especially when the production site is a very costly offshore operation. A further disadvantage of cement is that in view of its particle based structure the material exhibits relatively poor penetration capabilities in formations, which may result in reduced sealing effect.

There are references in the literature using resin based cementing materials for geothermal wellbores. In "New, Novel Well-Cementing Polymer Concrete Composite", American Concrete Institute (ACI), Special Publication 69: "Application of Polymer Concrete", 1981, part 69-5, pp. 73-92, Zelding, A. N., et al describe a system based on resin with initiator and inhibitor, where complete curing of the resin depends on the presence of water. The main component of the resin is organic siloxanes.

WO 94/12445 discloses an alternative material to cement and water slurries, developed for the completion of primary and secondary cementing of deep, hot oil wells with static background temperature in the range of 120-200° C. (248-392° F.). The binder is based on diallyl phthalate resin with the setting/curing time controlled by the addition of a temperature sensitive peroxide initiator and a suitable inhibitor.

Various sealants are known in the art for lining or strengthening boreholes. Where sealants are employed, a resin or monomer must be selected for each well that is compatible with the drilling/completion fluid used. Epoxy resins provide the best comprehensive strength, tensile strength and adhesion properties. However, epoxy resins and/or their curing agents have poor compatibility and poor performance with olefins, esters, and paraffinic hydrocarbon fluid.

WO 97/15746 discloses a composition for sealing different types of zones in oil wells, which includes a monomer, initiator, inhibitor and optional filler as well as other additives.

U.S. Pat. No. 4,556,109 discloses a system based on curing according to a condensation mechanism, rather than free radical polymerization.

Acrylate or methacrylate resins/monomers are available that are soluble in olefin, ester, and paraffinic hydrocarbon fluids. However, alone, these monomers and resins fail to provide the type of material properties required for geosynthetic composite linings. They typically have poor tensile strength, poor fracture toughness, and low compressive strength. Blends of acrylate monomers containing prepolymers have improved tensile strength, compressive strength, and fracture toughness. However, the prepolymers used in these blends are often insoluble in the hydrocarbon fluids previously discussed.

There is a distinct need in the art for chemical formulations which can provide in-situ geosynthetic composites which are completely soluble in non-aqueous drilling fluids, invert emulsion drilling fluids, drilling fluids made with diesel and mineral oils, and combinations thereof, and blends of any of these with olefins, esters, and paraffinic oils. There is also a need for in-situ geosynthetic composites which provide good radial penetration and which set faster. It would constitute a distinct advance in the art if a formulation were available for forming a composite in-situ that contained a blend of components that could be adapted to provide optimum material properties depending on the properties and conditions encountered in the formation by simply altering the type and concentration of crosslinking monomer and/or solvent and by varying the amount of each component. It would be additionally advantageous if the formulation exhibited improved compatibility with any combination of non-aqueous drilling fluids, invert emulsion drilling fluids, or drilling fluids made with diesel and mineral oils, and any blend of any of said drilling fluids with one or more esters, olefins, and paraffin oils, or combinations thereof.

SUMMARY OF THE INVENTION

The present invention is a composition useful for creating geosynthetic composites in-situ, said composition including: a reactive ester, or blend of esters, having at least one carbon-carbon double bond, preferably selected from a vinyl ester of a $C_9$ to $C_{11}$ versatic acid and a vinyl ester of a long chain fatty acid, or blends thereof, and an unsaturated thermoplastic elastomer having at least one carbon-carbon double bond soluble in the reactive vinyl ester; and a di- or tri-functional acrylate or methacrylate monomer. The formulation may further include a non-aqueous drilling fluid.

The reactive ester may be soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils. The composition may further contain additives to initiate and control time of polymerization selected from: free-radical generating additive to initiate polymerization; and a reaction retarder or polymerization inhibitor to delay the onset of polymerization until completion of injection into the formation has been completed. The composition may also contain other additives selected from one or more of a) coupling agents; b) suspending agents; c) dyes; d) weighting agents; e) lost circulation materials; and f) other additives known in the art, or any combination thereof. The formulation, including amounts of each component, and the chemical composition and material properties of the thermoplastic elastomer, where applicable, are varied to provide the required material properties for the geosynthetic composite formed in-situ by chemical treatment.

DETAILED DESCRIPTION OF THE INVENTION

Where functionalized saturated thermoplastic rubbers are incorporated, the functional groups can be hydroxyl, carboxyl, or maleic acid. Maleic acid/maleic anhydride functionalities incorporated into the molecular composition of the saturated thermoplastic elastomer provide crosslinking sites to alter material properties of the cured formulation. A suitable amount of saturated, thermoplastic elastomer, or blend thereof, is in the range of about 1 to 15 wt percent.

As mentioned above a saturated thermoplastic elastomer with or without pendant functional groups can optionally be added to the combination including the unsaturated thermoplastic elastomer. Therefore, it is within the scope of the invention to utilize blends of unsaturated thermoplastic elastomers and saturated thermoplastic elastomers, such as, for example, blending the Kraton D series and Kraton G series. Furthermore, it is within the scope of the invention to blend unsaturated thermoplastic elastomers with functionalized elastomers, such as, for example, blending the Kraton D series and Kraton FG series, as well as utilizing blends of saturated, unsaturated and functionalized thermoplastic elastomers or respective Kraton series product. The preferred saturated, thermoplastic elastomers for use in the present invention are selected from the radial or star saturated thermoplastic polymers.

A solvent may be employed to dilute the blend of the selected formulation, improve wetting of formation surfaces, and improve tolerance to water contamination. The solvent should be miscible with water and hydrocarbons and may be selected from any convenient type, which would be apparent to those skilled in the art. Suitable solvents include, but are not limited to low molecular weight anhydrous alcohols such as methanol, ethanol, propanol; ethers and polyethers, such as tetrahydrofuran, dioxane, ethylene glycol monoalkyl ethers, polyethylene glycol monoalkylethers or glycol ether esters; ether alcohols such as 2-butoxyethanol, or mixtures thereof. Preferred solvents include ethylene glycol monobutyl ether, propylene glycol methyl ether acetate, and other solvents effective for dissolving the thermoplastic elastomer, or mixtures thereof. A suitable concentration of solvent can range from 0 to 50 wt percent, more preferably 1 to 35 wt percent, and most preferably 5 to 25 wt percent.

A catalyst or initiator is useful in the application of the present invention. The use of catalysts and initiators is known in the art and the invention is not intended to be limited to any particular type. Suitable free radical initiating catalysts or catalyst systems may include, for example, but not be limited to azo compounds, alkyl or acyl peroxides or hydroperoxides, ketoperoxides, peroxy esters, peroxy carbonates, and peroxy ketals, or mixtures thereof. Such compounds vary with respect to activation temperature and half-life or, in other words, the temperature at which their reaction is initiated and becomes extensive. Examples of suitable alkyl peroxides, dialkyl peroxides, hydroperoxides, acyl peroxides, peroxy esters and peroxy ketals include, but are not limited to benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyl peroxide, t-butyl perbenzoate, and t-butyl peracetate, or mixtures thereof. The catalyst may be employed in total amounts from about 0.001 to about 20 weight percent based upon the weight of the polymerizable monomer.

Blocked catalysts may be used at elevated temperature to delay the polymerization reaction. Blocked catalysts are amine salts of aromatic sulfonic acids. Examples include the amine salts of dinonylnapthalene disulfonic acid, dinonylnapthalene sulfonic acid, dodecylbenzene sulfonic acid, and para-toluene sulfonic acid, and mixtures thereof. These blocked catalysts do not become effective catalysts until converted to their acid form by temperature. For example, para-toluene sulfonic acid can cure resins at room temperature. The amine salts of para-toluene sulfonic acid will not cure resins below 65° C. to 90° C.

Likewise an inhibitor may be required and the invention is not intended to be limited to any particular inhibitor. Those skilled in the art would recognize suitable inhibitors. Examples of suitable inhibitors for free radical polymerization reactions include, for example, benzoyl quinone, para-benzoquinone, tertiary butyl catechol, and the like, and mixtures thereof, which exhibit efficacy at elevated temperatures. Some inhibitors are not adequately effective at elevated temperatures. Additional examples of inhibitors include hydroquinones, such as, for example methyl hydroquinone and methyl ethyl hydroquinone. Polyols, polyhydroxy ethers, alcohols and bases are inhibitors for acid-catalyzed condensation reactions The quantity of inhibitor is adapted to the reactive, polymerizable prepolymer and monomer components in question, including the desired pot life and curing time. In general the inhibitor is present in a quantity from about 0.02 to 2 weight parts. The preferred quantity results in the proper exothermic process and short curing time.

A catalyst is preferably used, but an inhibitor is not always necessary. When the temperature in the well is elevated, say for example, higher than 150°, the reaction may go too fast. At that point the inhibitor is added, acts as a free radical scavenger, and prevents the polymerization from proceeding too fast. Eventually the inhibitor may be used up and the free radical or acid groups then initiate polymerization, which is subsequently self-sustaining. In some high temperature wells the inhibitor can only decrease the boiling point a limited amount and where the inhibitor has limited effectiveness there may be a negative impact on the molecular weight of the geosynthetic composite in that it is lower than would be optimally desirable.

Other additives can be incorporated into the formulation including, but not limited to coupling agents, suspending agents, dyes, weighting agents, and lost circulation materials.

Numerous coupling agents are known in the art and the invention is not intended to be limited to particular agents. In some embodiments, the coupling agent may include silane coupling agents. A suitable silane coupling agent may be selected from among vinyltrimethoxysilane, vinyltriethoxysilane, vinyltris (β-methoxyethoxy) silane, vinylmethyldimethoxysilane, vinylmethyldiethoxysilane, δ-glycidoxypropyltrimethoxysilane, δ-glycidoxypropylmethyldimethoxysilane, δ-methacryloxypropyltrimethoxysilane, δ-methacryloxypropylmethyldimethoxysilane, acryloxypropyltrimethoxysilane, acryloxypropylmethyldimethoxysilane, N-β-(aminoethyl)-δ-aminopropyltrimethoxysilane, N-β-(aminoethyl)-δ-aminopropyltriethoxysilane, N-β-(aminoethyl)-δ-aminopropylmethyldimethoxysilane, and N-β-(aminoethyl)-δ-aminopropylmethyldiethoxysilane, and mixtures thereof. Also suitable are bifunctional sulfur-containing organo silanes such as, for example, bis-(3-triethoxy-silylpropyl) tetrasulfide, bis-(3-trimethoxy-silyl-propyl) tetrasulfide, and bis-(3-trimethoxy-silylpropyl) tetrasulfide grafted silica, available from DeGussa AG. A suitable concentration for a coupling agent is in the range of 0 to 10 wt percent.

Suspending agents known in the art can be added to the formulation to support solids. The invention is not intended to be limited to any particular agents, however suitable suspending agents include, for example, organophilic clays, amine treated clays, oil soluble polymers, quaternary ammonium compounds, polyamide resins, polycarboxylic acids, and soaps.

The formulation may also contain other common treatment fluid ingredients such as fluid loss control additives, dyes, anti-foaming agents when necessary, and the like, employed in typical quantities, known to those skilled in the art. Of course, the addition of such other additives should be avoided if it will detrimentally affect the basic desired properties of the treatment fluid.

Weighting agents or density materials may be added to the formulation. Suitable materials include, for example, galena, hematite, magnetite, iron oxides, ilmenite, barite, siderite, celestite, dolomite, calcite, manganese oxides, magnesium oxide, zinc oxide, zirconium oxides, spinels and the like. The quantity of such material added, if any, depends upon the desired density of the chemical treatment composition. Typically, weight material is added to result in a drilling fluid density of up to about 9 pounds per gallon. The weighted material is preferably added up to 5 pounds per barrel and most preferably up to 500 pounds per barrel of resin blend.

Lost circulation materials may also be incorporated into the formulation. These materials are generally categorized as fibers, flakes, granules, and mixtures. Specific examples include, but are not limited to, ground mica, mica flakes, silica slag, diatomaceous earth, hydrated borate, graded sand, diatomaceous earth, gilsonite, ground coal, charcoal, cellophane flakes or strips, cellulose fiber, expanded perlite, shredded paper or paper pulp, and the like, walnut or other nut hulls ground to different sizes, cottonseed hulls or cottonseed bolls, sugar cane fibers or bagess, flax, straw, ground hemp, ground fir bark, ground redwood bark and fibers, and grape extraction residue, crystalline silicas, amorphous silicas, clays, calcium carbonate, and barite. Suitable amounts of additional solid agents for use in combination with the copolymer(s) and/or ionomer(s) would be apparent to those skilled in the art.

The formulation, containing either choice of reactive monomer, including amounts of each component, and the chemical composition and material properties of the thermoplastic elastomer are varied to provide required material properties for the geosynthetic composite formed in-situ.

The method and apparatus for utilizing the formulation of the present invention is described in more detail in copending U.S. Ser. No. 60/576645, which is herein incorporated by reference. Major objectives of some embodiments include reducing the number of casing strings required to create a borehole of a specified depth, eliminating borehole diameter reductions necessitated by isolating geologic formations of significantly different properties with steel casings cemented into the earth at required intervals, and, ideally, allowing the creation of a single diameter or 'monobore', wellbore lined with a single casing, or no more than two casing strings after reaching the required depth. Copending U.S. Ser. No. 60/576430 is also related and is herein incorporated by reference.

The first step in the method for use of the formulation of the present invention is to determine or estimate the material properties of the exposed geological formation. Certain properties are assessed in order to select the proper treatment. These properties include, for example, fracture initiation pressure, tensile strength, Young's modulus and Poisson Ratio, temperature, porosity and permeability. Methods of obtaining this data are known to those skilled in the art and the invention is not intended to be limited to any particular methods of performing tests to determine these properties.

Once properties of the formation are determined, data may be obtained and analyzed to determine the required changes in material properties of the exposed geological formation that would be desirable to eliminate the need for setting an additional casing string. Given the changes desired the appropriate chemical formulation of the treatment may be selected, the necessary minimum radial penetration distance of the chemical treatment from the wellbore may be determined, and volume of chemical treatment may be determined The treatment process creates a cylindrical shell of a geosynthetic composite extending radially from the wellbore. Elastic modulus, tensile strength, compressive strength, fracture strength, fracture toughness and permeability of this geosynthetic composite are different from the surrounding formation. These properties allow the chemically treated region of the formation to withstand higher stresses (pressure) in the wellbore than the untreated formation without fracturing. The fracture pressure of the chemically treated region is higher than the untreated formation. The permeability of the chemically treated region is typically lower that the untreated formation.

The increased fracture pressure may be a function of the material properties of the geosynthetic composite and thickness of the treatment. The change in fracture initiation pressure can be estimated by equations, known in the art of mechanics, specifically rock mechanics, for calculating the fracture strength of formations. The impermeability of the geosynthetic composite is important in the change of fracture initiation pressure. The impermeable, treated portion of the formation acts as an elastic layer re-distributing the pressure applied to the wellbore to the surrounding formation, allowing higher stresses (pressures) to be applied before fracturing or failure of the wellbore occurs. Three modes of failure are possible with the impermeable, geosynthetic composite layer created by treatment of the formation: (a) fracture of the geosynthetic composite, (b) fracture of the untreated formation beyond the thickness of the geosynthetic composite, or (c) plastic failure of the geosynthetic composite. With some modes of failure, the impermeability of the layer is of critical importance and the thickness of the layer is of little importance except for the thickness required to obtain complete impermeability. In other modes of failure, thickness of the layer is of critical importance. Those skilled in the art of geomechanics will be able to use strength of materials principles to calculate the most likely mode of failure and required thickness of a layer to obtain a specific increase in fracture initiation pressure.

The volume of treatment is determined from radial penetration distance from the wellbore, length of interval, wellbore diameter and formation porosity. The volume of the cylindrical shell is calculated and multiplied by the porosity of the formation to estimate the volume of pore space to be filled with the chemical treatment. An excess volume may be added to compensate for the uncertainty in the estimation. The volume of the wellbore over the treated interval must be filled with chemical treatment before or during injection. This volume is also added to the formation treating volume and any excess to yield the required treating volume.

Permeability of the geologic formation to be treated is important. The formation must have sufficient permeability to allow the chemical treatment to flow into pores, displace pore fluids and bond particles of the formation together more strongly. It is desirable to treat formations having matrix permeabilities between 1 millidarcy and 50,000 millidarcy. Penetration rate typically increases with permeability at a constant injection pressure. The pressure required to inject the chemical treatment typically decreases with increasing permeability at a constant flow rate. Formations having permeability less than about 0.1 millidarcy are difficult to treat. Very low viscosity treating fluids, high injection pressures and long treatment times are required for low permeability formations. A practical solution for low permeability formations is to use a ductile, high strength material that requires a small radial penetration distance from the wellbore to achieve the desired increase in fracture pressure.

The amount of time required to perform the treatment is necessary for the formulation of the chemical treatment. The polymerization reaction should occur after injection of the treatment volume into the formation has been completed. However, the polymerization reaction should not occur too long after injection has been completed because dilution or flow-back or cross-flow of fluids within the wellbore is possible. Treatment time is estimated from the sum of time required to pump the chemical treatment into the wellbore adjacent to the geologic formation to be treated, the time required to inject the treatment into the formation, the time to retrieve or withdraw any treating tools or pipes from the treated interval plus a safety margin. Time required to pump the chemical treatment into the wellbore adjacent to the formation to be treated is calculated using the volume of the chemical treatement, the volume of the workstring, and the pump rate. The time required to inject chemical treatment volume into the formation can be calculated using the volume of the chemical to be injected and the filtration rate.

The pseudo-steady-state filtration rate can be determined from a filtration or fluid loss test using a formation core or a synthetic core having filtration properties representative of the geologic formation to be treated. This time to inject the chemical treatment must be less than the time to cure the formulation used. Generally, the borehole is filled over the volume to be treated with the formulation, and then optionally pressurized to the extent desired to force the formulation into the formation at the rate predicted by the filtration rate, plus a margin for errors and inconsistencies. Thus the desired volume of the formulation is forced into the formation over the interval to be treated.

The chemical treatment may be selected based upon a number of considerations, an important one being compatibility with wellbore fluids (i.e. drilling fluids, completion fluids, formation fluids.) The chemical treatment should be compatible with or miscible with wellbore fluids and, most preferably the chemical treatment should be completely soluble in wellbore fluids. In addition, any catalyst or initiator should be compatible with wellbore fluids. For example, in a fluid containing a high amount of acid soluble or acid neutralizing components, one should not use an acid catalyzed chemical treatment fluid. In addition, the selected chemical treatment should be capable of penetrating drilling fluid filter cake or near-wellbore formation damage, commonly referred to as skin.

Additional important factors to consider when selecting the chemical treatment are strength and material properties of the chemical treatment, viscosity of the chemical treatment, initiation or catalyzation type of chemical treatment, wellbore temperature, required placement time of chemical treatment into geological formation, and permeability, porosity, and lithology of the geological formation.

In practice, the thickness of the treated formation (geosynthetic composite) is greater than the minimum thickness required to achieve the desired increase in formation fracture initiation pressure. This is done because of the inhomogeneity of the formation and any variability in the injection process. As a result, the geological formation is treated to improve/increase material property values to the required levels by injecting a chemical treatment into the formation to create a geosynthetic composite extending 0.05 to 5 meters, preferably 0.1 to 3 meters, most preferably 0.25 to 2 meters radially from the borehole. The chemical treatment type and the depth of penetration are interrelated and should be determined based upon the geologic formation type; the permeability and porosity of the untreated formation; the presence of natural or induced fractures, fissures, faults or vugs; and the required material properties of the geosynthetic composite to be formed in-situ by the chemical treatment. Less radial penetration may by required in strong formations or when using high strength chemical treatments. Deeper radial penetration may be required for weak or unconsolidated formations and/or lower strength chemical treatments.

The first step in the method of utilizing the formulation may be to determine or estimate the material properties of the exposed geological formations. These properties could include the type of geological formation, the permeability and porosity of the untreated formation, and presence of natural or induced fractures, fissures, faults, or vugs. The next step may be to determine the required changes in material properties of the exposed geologic formation necessary to eliminate the need for setting a casing string before drilling operations can continue.

With respect to the changes in material properties needed to continue drilling and eliminate the need for setting a casing string, the formulation may be selected taking into consideration compatibility with wellbore fluids, (i.e. drilling fluids, completion fluids, formation fluids), strength and material properties of chemical treatment, viscosity of chemical treatment solution, initiation or catalyzation type of chemical treatment, wellbore temperature, required placement time of chemical treatment in geological formation, and permeability, porosity and lithology of the formation.

The chemical treatment should be at least compatible with wellbore fluids, and preferably completely soluble in wellbore fluids. The catalyst or initiator should also be compatible with wellbore fluids. In addition, the chemical treatment should be capable of penetrating drilling fluid filter cake or near-wellbore formation damage. Less radial penetration may be required in strong formations or with high strength chemical treatments, and deeper radial penetration may be required for weak or unconsolidated formations and/or lower strength chemical treatments.

The formation is treated to improve/increase material property values to the required levels by selecting an appropriate treatment formulation and injecting said treatment into the formation to create a geosynthetic composite extending 0.05 to 5 m, more preferably 0.1 to 3 m, and most preferably 0.25 to 2 m radially from the borehole wall.

The chemical treatment formulation of the present invention may be applied to the wellbore through the drill string (BHA), by an open-ended treatment if a large LCM (lost circulation material) is used, by a spot-and-hesitation squeeze, or by a bullhead-and-hesitation squeeze (particularly in a severe loss zone). Preferably the composite will exhibit radial penetration away from the wellbore of 0.25 to 2 m. The monomer/resin formulation hardens in the pores of the formation and bonds formation particles together to form a rock-plastic composite.

After treatment the material properties of the geosynthetic composite are improved over the untreated geological formation. The fracture initiation pressure is increased, tensile strength increased, Young's modulus and Poisson Ratio are favorably altered to improve formation ductility, fracture toughness, and compressive strength, and the permeability is reduced.

After a zone is treated it can be pressure tested and drilling can be resumed. It may be appropriate at this point to use a higher or lower mud weight, as will be apparent to those skilled in the art.

Figure 1:
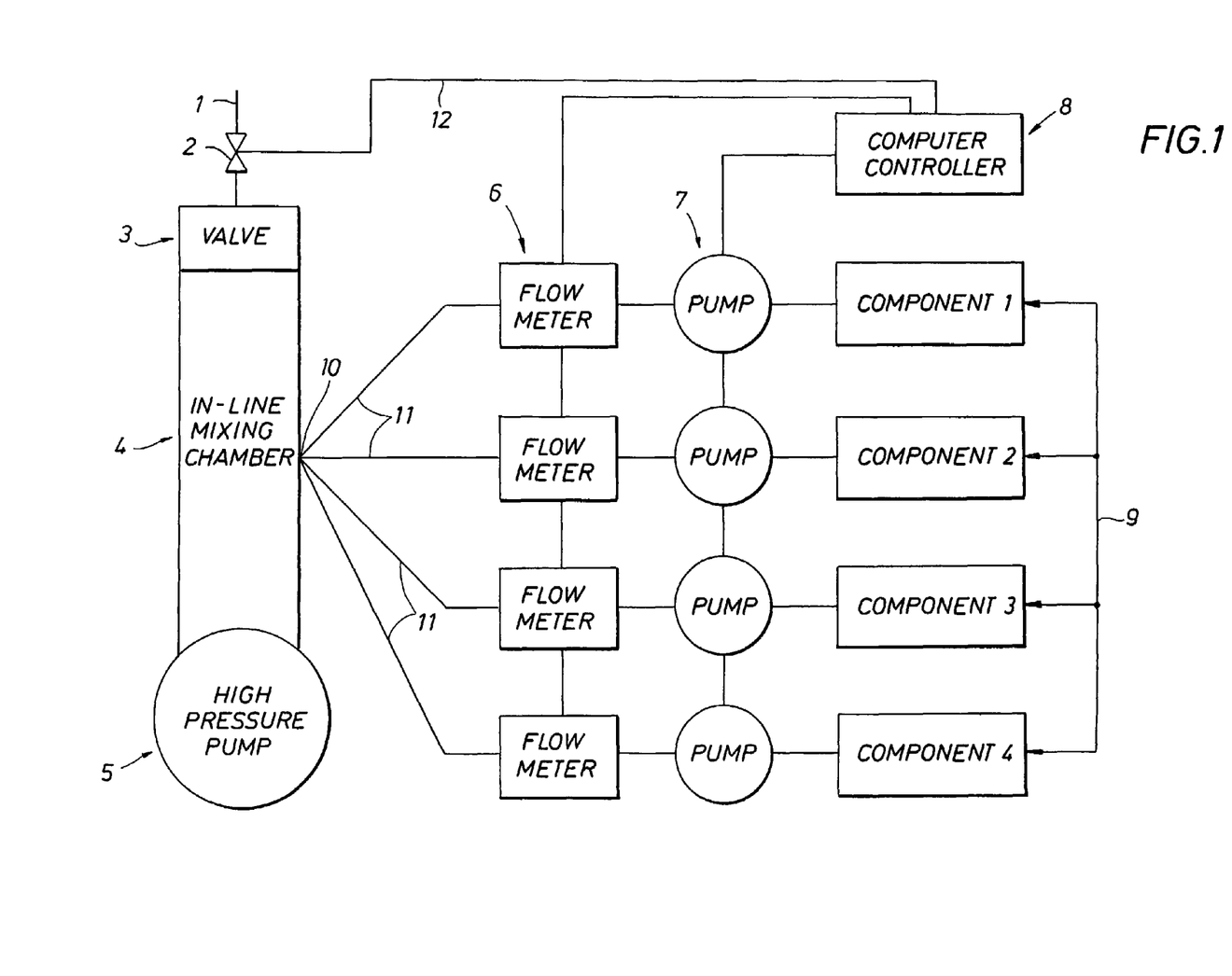
FIG. 1 is a schematic drawing of the in-line apparatus for mixing and pumping the chemical treatment formulations in the present invention.
Figure 2:
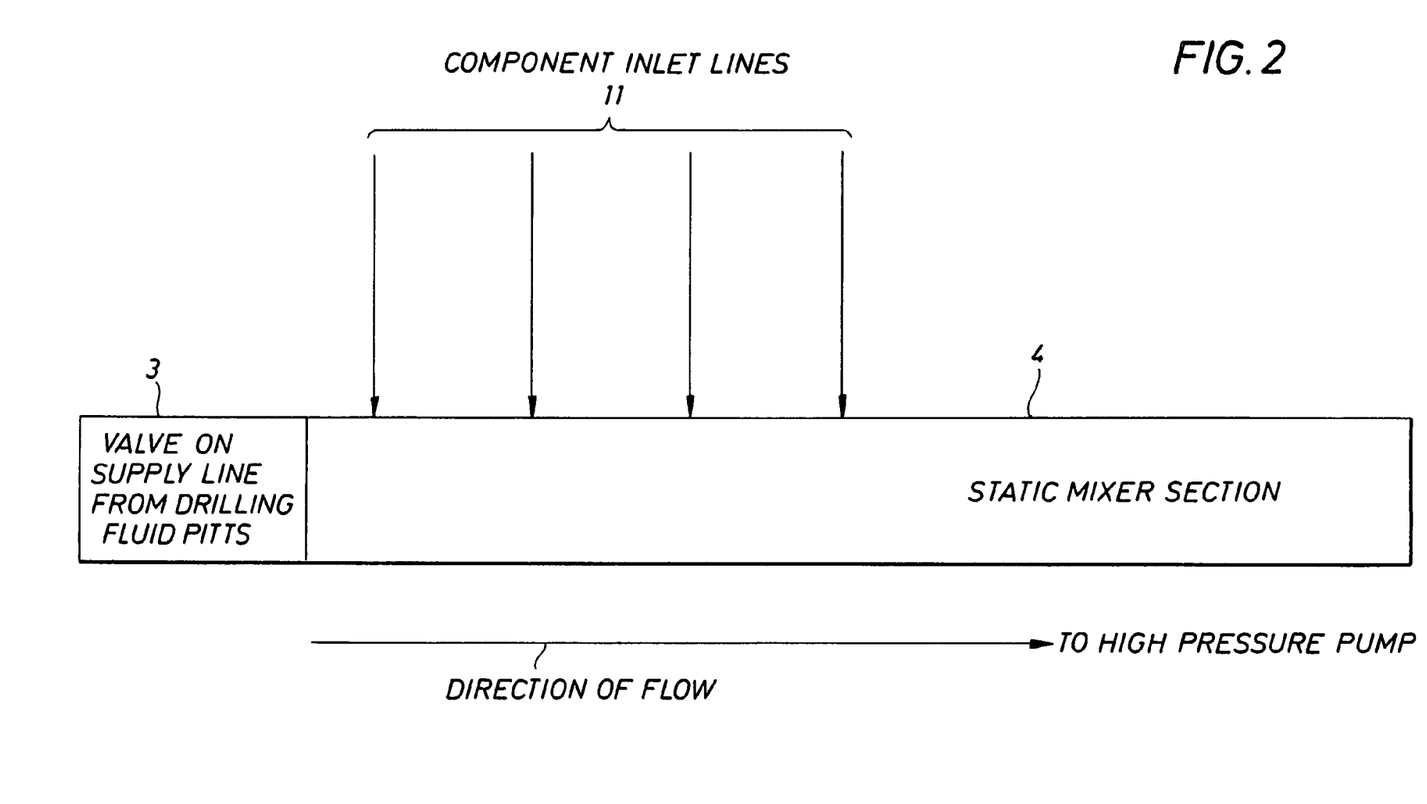
FIG. 2 is a schematic drawing showing an alternative position for component lines.

In the present invention components can be continuously mixed in an automated chemical metering and pumping system. With reference to FIG. 1, 1 represents a line bringing drilling fluid from the mud pits, 2 represents a flowmeter with a feedback mechanism 12 that is in communication with computer controls, 3 is a valve, 4 is an in-line mixing chamber, and 5 is a high pressure pump. The flowmeter and feedback mechanism permit automatic adjustment if flow from the mud pits is reduced. The various components, i.e. suitable melamine-formaldehydes, reactive ester(s) having at least one carbon-carbon double bond, unsaturated thermoplastic elastomers, di- or tri-functional acrylate or methacrylate monomer, polyol, poly (hydroxy) ether, etc. are stored in a plurality of component vessels represented by 9. Four are represented for illustration, but there may be any number as would be apparent to those skilled in the art. Each vessel 9 containing chemical components is in fluid communication with the in-line mixing vessel 4 by means of lines or hoses 11. At the point where the lines or hoses connect to the component vessels 9 there are preferably valves (not shown) so that if a hose is disconnected the operator effectively has an individually closed and uncontaminated source. These hoses would suitably be automatic quick connect hoses, known in the art. On each line or hose is situated a pump 7 and a flow meter 6. In addition, the pump 7 and flow meter 6 for each vessel is in communication with computer controls, represented by 8. Component inlet lines from each of the flow meters 6 flow into the in-line mixing vessel at point 10. The component inlet lines can all enter the mixing section at one point as shown in FIG. 1, or they can enter at separate points as shown in FIG. 2.

Various components can be mixed in the enclosed, in-line mixing device 4 prior to pumping into a well. The pump 5 used to inject the chemical mixture into the well may be part of the drilling/workover rig. It is also within the scope of the invention that the pump used to inject the chemical mixture into the well may be a specialized high pressure pump, such as a cement pump or stimulation pump that is not an integral part of the drilling/workover rig.

The process could be run manually, but is preferably computer controlled and automated to accurately inject and combine all components in variable, user-selected ratios, depending upon the chemical formulation. Suitable types of computer controls would be known to those skilled in the art. For example, a process loop control system would be suitable. The in-line mixer and computer controlled system is an improvement because many chemical treatments for use in boreholes often utilize chemicals that are toxic to humans and to the environment. Exposure to chemicals sometimes occurs during mixing in open tanks. Also, many mixing tanks have a 'dead space volume' that cannot be drained during the treatment. This excess volume must be disposed of along with the fluids used to clean the tank after use that are contaminated with the toxic chemical mixture. Thus, the method of the present invention eliminates the need for mixing tanks, cleaning mixing tanks and reducing waste fluids that must be disposed of after the treatment has been performed. The method improves safety, reduces environmental requirements for waste disposal, and reduces exposure of personnel to hazardous chemicals. HSE issues are greatly reduced. The method may be applied to mixtures of chemical treating materials with drilling/completion fluids or the chemical treating fluid alone.

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

EXAMPLES 1-17

Examples 1 through 17 demonstrate the preparation of various formulations and include the generic description and percent weight of each component. Veova™ is the tradename for $C_9$ to $C_{11}$, versatic acids available from Resolution Performance Products. Kraton® is the tradename for saturated thermoplastic elastomers available commercially from Kraton® Polymer. Resimene® is the tradename for melamine-formaldehyde resins, which can be obtained commercially from Solutia, Inc. CYMEL® is the tradename for melamine-formaldehyde resins commercially available from Cytec Industries. These compositions are each useful in some embodiments of the present invention and represent a range of different resulting properties of the cured materials.

EXAMPLE 1

| Component | Description/Function | Amount % weight |
|---|---|---|
| Veova-10 Monomer | Vinyl Ester of Neodecanoic Acid | 65 |
| Trimethylolpropane trimethacrylate | Tri-functional acrylate monomer/crosslinker | 15 |
| Ethylene glycol monobutyl ether | Mutual solvent | 7.5 |
| Kraton D-1122X | Unsaturated, radial-shape thermoplastic elastomer | 10 |
| Kraton G-1780M | Saturated, star-shaped, thermoplastic elastomer | 2.5 |
| Total | | 100 |

EXAMPLE 2

| Component | Description/Function | Amount % weight |
|---|---|---|
| Veova-10 Monomer | Vinyl Ester of Neodecanoic Acid | 45 |
| Lauryl Methacrylate | Monofunctional acrylate monomer | 25 |
| Trimethylolpropane trimethacrylate | Tri-functional acrylate monomer/crosslinker | 15 |
| Ethylene glycol monobutyl ether | Mutual solvent | 75 |
| Kraton D-1184 | Unsaturated, radial-shape thermoplastic elastomer | 5 |
| Kraton G-1780X | Saturated, star-shaped, thermoplastic elastomer | 2.5 |
| Total | | 100 |

EXAMPLE 3

| Component | Description/Function | Amount % weight |
|---|---|---|
| Veova-10 Monomer | Vinyl Ester of Neodecanoic Acid | 45 |
| Stearyl methacrylate | Monofunctional acrylate monomer | 25 |
| Trimethylolpropane trimethacrylate | Tri-functional acrylate monomer/crosslinker | 15 |
| Ethylene glycol monobutyl ether | Mutual solvent | 7.5 |
| Kraton D-1184 | Unsaturated, radial-shape thermoplastic elastomer | 5 |
| Kraton G-1780X | Saturated, star-shaped, thermoplastic elastomer | 2.5 |
| Total | | 100 |

EXAMPLE 4

| Component | Description/Function | Amount % weight |
|---|---|---|
| Veova-10 Monomer | Vinyl Ester of Neodecanoic Acid | 80 |
| Lauryl methacrylate | Monofunctional acrylate monomer | 0 |
| Trimethylolpropane trimethacrylate | Tri-functional acrylate monomer/crosslinker | 10 |
| Ethylene glycol monobutyl ether | Mutual solvent | 0 |
| Kraton D-1122X | Unsaturated, radial-shape thermoplastic elastomer | 10 |
| Total | | 100 |

EXAMPLE 5

| Component | Description/Function | Amount % weight |
|---|---|---|
| Veova-10 Monomer | Vinyl Ester of Neodecanoic Acid | 75 |
| Lauryl methacrylate | Monofunctional acrylate monomer | 0 |
| Trimethylolpropane trimethacrylate | Tri-functional acrylate monomer/crosslinker | 15 |
| Ethylene glycol monobutyl ether | Mutual solvent | 0 |
| Kraton D-1184 | Unsaturated, radial-shape thermoplastic elastomer | 10 |
| Total | | 100 |

EXAMPLE 6

| Component | Description/Function | Amount % weight |
|---|---|---|
| Veova-10 Monomer | Vinyl Ester of Neodecanoic Acid | 70 |
| Lauryl methacrylate | Monofunctional acrylate monomer | 0 |
| Tripropylene glycol diacrylate | Di-functional acrylate monomer/crosslinker | 10 |
| Ethylene glycol monobutyl ether | Mutual solvent | 10 |
| Kraton D-1122X | Unsaturated, radial-shape thermoplastic elastomer | 10 |
| Total | | 100 |

EXAMPLE 7

| Component | Description/Function | Amount % weight |
|---|---|---|
| Veova-10 Monomer | Vinyl Ester of Neodecanoic Acid | 65 |
| Lauryl methacrylate | Monofunctional acrylate monomer | 0 |
| Resimene CE-6550 | Co-etherfied amino resin crosslinker | 5 |
| Tripropyleneglycol dimethacrylate | Di-functional acrylate monomer/crosslinker | 20 |
| Kraton D-1122X | Unsaturated, radial-shape thermoplastic elastomer | 10 |
| Total | | 100 |

EXAMPLE 7

| Component | Description/Function | Amount % weight |
|---|---|---|
| Veova-10 Monomer | Vinyl Ester of Neodecanoic Acid | 65 |
| Lauryl methacrylate | Monofunctional acrylate monomer | 0 |
| Resimene CE-6550 | Co-etherfied amino resin crosslinker | 5 |
| Tripropyleneglycol dimethacrylate | Di-functional acrylate monomer/crosslinker | 20 |
| Kraton D-1122X | Unsaturated, radial-shape thermoplastic elastomer | 10 |
| Total | | 100 |

EXAMPLE 8

Example 8 demonstrates the use in the field of a resin mixture containing at least one reactive component selected from a blend of at least one reactive ester having at least one carbon-carbon double bond, at least one unsaturated thermoplastic elastomer containing at least one carbon-carbon double bond soluble in the reactive ester; and at least one di- or tri-functional acrylate or methacrylate monomer soluble in non-aqueous drilling fluids and invert emulsion drilling fluids containing $C_7$ to $C_{20}$ olefins, esters, paraffinic oils and blends thereof, and also soluble in diesel and mineral oils and blends thereof with $C_7$ to $C_{20}$ olefins, esters, and paraffinic oils; and optionally containing other additives selected from one or more of coupling agents, suspending agents, dyes, weighting agents, lost circulation materials, and other additives known in the art, or any combination thereof, and further optionally containing a saturated thermoplastic elastomer.

A resin mixture was used to eliminate a casing string in a deepwater development well in the Gulf of Mexico. The upper Yellow sand had been previously produced by another well in the field. The lower Yellow sand was the producing formation for this new well and was at its original, unproduced pressure. The drilling fluid weight required to control formation pressures in the lower Yellow sand was close to or slightly greater than the fracture initiation pressure of the depleted upper Yellow sand.

The upper Yellow sand was present between 19,900 feet and 20,065 feet measured depth. Bottom-hole circulating temperature was 155° F. and the static bottom-hole temperature was estimated as 185° F. The hydrostatic pressure of the drilling fluid column in the wellbore while drilling the upper Yellow sand was approximately 6000 psi greater than the formation pore pressure. This substantial over-pressure increased the risk of fracturing the upper Yellow sand during drilling. Higher drilling fluid weights were required to drill and control the pore pressure of the higher pressured lower Yellow sand. This increased hydrostatic pressure would exceed the fracture initiation pressure of the upper Yellow sand.

A resin treatment to strengthen the upper Yellow sand prior to drilling the lower Yellow sand was planned as part of the well design. This treatment eliminated the need to set an additional steel casing string to isolate the upper and lower Yellow sands.

An acrylate monomer blend was added to the drilling mud. The unconsolidated upper Yellow sand had a compressive strength of about 20 to 30 psi and a permeability of between 500 and 600 md. Afterward the compressive strength of the sand was about 140 to 175 psi and the permeability was zero. There was no flow through the core observed or fracture of matrix with 1500 psi differential pressure after resin set.

Resin formulation:

| | | |
|---|---|---|
| 23.1 | gallons | Drilling Fluid (12.8 lb/gal) |
| 11.3 | gallons | Polyethyleneglycol 400 Dimethacrylate monomer |
| 3.8 | gallons | Trimethylolpropane trimethacrylate monomer |
| 100.1 | pounds | Barite |
| 0.15 | lbs | tertiary- Butyl Hydroperoxide catalyst |

It is noted that Veova-10 was not available at the time of this work so the formulation was prepared without it, but the inclusion of Veova-10 would be preferable.

Procedure:

A spot-and-squeeze technique was used for this treatment. The procedure follows:
1. Run drillstring and tag total depth. Total depth of the wellbore was approximately 100 feet below the bottom of the weak interval to be treated. The weak formation was approximately 125 feet thick. Hole diameter was 8.5 to 9 inch on average through this formation.
2. Pull up drillstring 50 feet above total depth.
3. Spot 50 bbls of the resin mixture across and extending above the top of the weak formation. The column length of the resin mixture was approximately 700 ft. Excess volume was spotted to allow a volume of the resin to be injected into the matrix of the formation. Spotting the fluid is accomplished by pumping the resin mixture into the drill string, pumping a fluid (typically the drilling fluid) behind to displace the resin mixture out the end of the drill string and out into the annulus between the wellbore and drill string. The annulus is open at the surface to allow fluid to be circulated out of the wellbore as the resin mixture is placed.
4. After spotting the resin mixture in the wellbore, the drill string was pulled up approximately 300 feet above the top of the resin fluid pill spotted in wellbore.
5. The annular blowout preventer was closed.
6. Fluid was pumped down the drill string to squeeze the resin into the weak formation.
7. Radial penetration of the resin into the wellbore could be calculated from the volume of fluid squeezed into the formation, formation porosity, formation thickness (height) and wellbore diameter. Calculated radial penetration distance for the resin in this treatment was 1.5 m (4.8 feet).
8. After squeezing resin into the formation, the well was shut in for 8 hours prior to cleaning set resin out of the wellbore and resuming drilling operations to deepen the well.

The drilling fluid weight was increased to 13.9 lb/gal during drilling operations to total depth and no lost circulation occurred. The resin treatment effectively strengthened the formation near the wellbore. It was calculated the formulation penetrated the formation about 4.8 ft. and consolidated sand into a plastic composite.

The invention claimed is:

1. A composition useful for creating geosynthetic composites in-situ, said composition comprising:
   at least one reactive ester having at least one carbon-carbon double bond selected from vinyl esters of versatic acids and vinyl esters of long chain fatty acids;
   at least one unsaturated thermoplastic elastomer containing at least one carbon-carbon double bond soluble in the reactive ester; and
   a di- or tri-functional acrylate or methacrylate monomer
   wherein the reactive ester is present in the amount of from 45 to 80 wt percent based on the total weight of the composition.

2. The composition of claim 1 further comprising a non-aqueous drilling fluid.

3. The composition of claim 2 wherein the drilling fluid comprises components selected from the group consisting of $C_7$ to $C_{20}$ olefins, esters, paraffinic oils, diesel and mineral oils.

4. The composition of claim 1 further comprising an additive selected from the group consisting of coupling agents, suspending agents, dyes, weighting agents, lost circulation materials, and combinations thereof.

5. The composition of claim 1 further comprising an additive selected from the group of catalysts and inhibitors to initiate and control time of polymerization.

6. The composition of claim 1 wherein the reactive ester comprises vinyl ester of a $C_9$ to $C_{11}$ versatic acid.

7. The composition of claim 1 wherein the unsaturated thermoplastic elastomer soluble in the reactive ester is selected from linear, radial, or star configuration di- or tri-block polymer(s) having at least one unsaturated carbon-carbon bond.

8. The composition of claim 1 wherein the unsaturated thermoplastic elastomer is selected from di- or tri-polymers comprising styrene-butadiene-styrene or styrene-isoprene-styrene.

9. The composition of claim 1 wherein the unsaturated thermoplastic elastomer has a styrene: rubber ratio between 15:85 and 75:25.

10. The composition of claim 1 wherein the amount of unsaturated thermoplastic elastomer present in the composition is in the range of 1 to 30 wt percent.

11. The composition of claim 1 wherein the amount of unsaturated thermoplastic elastomer present in the composition is in the range of 2.5 to 25 wt percent.

12. The composition of claim 1 wherein the amount of unsaturated thermoplastic elastomer is in the range of 5 to 20 wt percent.

13. The composition of claim 1 further comprising a saturated thermoplastic elastomer.

14. The composition of claim 13 wherein the concentration of the thermoplastic elastomer is selected to control viscosity and provide suspension for solids.

15. The composition of claim 13 wherein a saturated thermoplastic is selected from radial or star shaped and functionalized saturated thermoplastic rubbers.

16. The composition of claim 13 wherein the saturated thermoplastic elastomer is a functionalized saturated thermoplastic rubber wherein the functional groups are selected from hydroxyl, carboxyl, and maleic acid/maleic anhyride.

17. The composition of claim 13 wherein the saturated thermoplastic elastomer is incorporated in an amount in the range of from about 1 to 15 wt percent.

18. The composition of claim 13 wherein the saturated thermoplastic elastomer is incorporated and is selected from the radial or star saturated thermoplastic polymers.

19. The composition of claim 1 further comprising the use of a solvent miscible with water and hydrocarbons to dilute the composition.

20. The composition of claim 19 wherein the miscible solvent is a low molecular weight anhydrous alcohol.

21. The composition of claim 20 wherein the low molecular weight anhydrous alcohol is selected from the group consisting of methanol, ethanol, propanol, and combinations thereof.

22. The composition of claim 19 wherein the miscible solvent is selected from the group consisting of ethers and polyethers.

23. The composition of claim 22 wherein the ethers and polyethers are selected from the group consisting of tetrahydrofuran, dioxane, ethylene glycol monoalkyl ethers, polyethyleneglycol monoalkylethers, glycol ether esters, and combinations thereof.

24. The composition of claim 19 wherein the miscible solvent is selected from the group consisting of ether alcohols.

25. The composition of claim 24 wherein the miscible solvent is 2-butoxyethanol.

26. The composition of claim 23 wherein the miscible solvent is selected from the group consisting of ethylene glycol monobutyl ether, propylene glycol methyl ether acetate, and combinations thereof.

27. The composition of claim 19 wherein the concentration of miscible solvent is in the range of from 0 to about 50 wt percent.

28. The composition of claim 27 wherein the concentration of miscible solvent is in the range of from about 1 to 35 wt percent.

29. The composition of claim 28 wherein the concentration of miscible solvent is in the range of from about 5 to 25 wt percent.

30. The composition of claim 1 further comprising a coupling agent.

31. The composition of claim 30 wherein the coupling agent is a silane coupling agent.

32. The composition of claim 31 wherein the silane coupling agent is selected from the group consisting of vinyltrimethoxysilane, vinyltriethoxysilane, vinyltris(β-methoxyethoxy) silane, vinylmethyldimethoxysilane, vinylmethyldiethoxysilane, δ-glycidoxypropyltrimethoxysilane, δ-glycidoxypropylmethyldimethoxysilane, δ-methacryloxypropyltrimethoxysilane, δ-methacryloxypropylmethyldimethoxysilane, acryloxypropyltrimethoxysilane, acryloxypropylmethyldimethoxysilane, N-β-(aminoethyl)-δ-aminopropyltrimethoxysilane, N-β-(aminoethyl)-δ-aminopropyltriethoxysilane, N-β-(aminoethyl)-δ-aminopropyl-methyldimethoxysilane, N-β-(aminoethyl)-δ-aminopropylmethyldiethoxysilane, and mixtures thereof.

33. The composition of claim 31 wherein the silane coupling agent is a bifunctional sulfur-containing organo silanes.

34. The composition of claim 31 wherein the silane coupling agent is selected from bis-(3-triethoxy-silylpropyl) tetrasulfide, bis-(3-trimethoxy-silyl propyl) tetrasulfide, and bis-(3-trimethoxy-silylpropyl) tetrasulfide grafted silica.

35. The composition of claim 31 wherein the concentration of coupling agent is in the range of from about 0 to 10 wt percent.

36. The composition of claim 1 further comprising the incorporation of a suspending agent.

37. The composition of claim 36 wherein the suspending agent is selected from the group consisting of organophilic clays, amine treated clays, oil soluble polymers, polyamide resins, polycarboxylic acids, and soaps.

38. The composition of claim 36 wherein the suspending agent is present in an amount in the range from about 0 to 15% by weight in the formulations.

39. The composition of claim 1 further comprising a dye.

40. The composition of claim 1 further comprising a weighting agent.

41. The composition of claim 40 wherein the weighting agent is selected from the group consisting of galena, hematite, magnetite, iron oxides, ilmenite, barite, siderite, celestite, dolomite, calcite, manganese oxides, magnesium oxide, zinc oxide, zirconium oxides, spinels and the like, and combinations thereof.

42. The composition of claim 40 wherein the weighting agent is in a concentration of from about 5 to 500 lbs/bbl.

43. The composition of claim 1 further comprising a lost circulation material.

44. The composition of claim 4 wherein the additive is a free-radical generating additive to initiate polymerization.

45. The composition of claim 44 further comprising a reaction retarder or polymerization inhibitor to delay the onset of polymerization until completion of injection into the formation has been completed.

46. The composition of claim 5 wherein the catalyst is selected from the group consisting of a free radical initiating catalyst, azo compounds, alkyl or acyl peroxides or hydroperoxides, dialkyl peroxides, ketoperoxides, peroxy esters, peroxy carbonates, peroxy ketals, and combinations thereof.

47. The composition of claim 46 wherein the free radical initiating catalyst is selected from the group consisting of benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyl peroxide, t-butyl perbenzoate, t-butyl peracetate, and combinations thereof.

48. The composition of claim 5 wherein the catalyst is employed in total amounts from about 0.001 to about 20 weight percent based upon the weight of the polymerizable monomer.

49. The composition of claim 5 wherein an inhibitor is selected from the group consisting of quinones, hydroquinones, and catechols.

50. A drilling fluid for creating geosynthetic composites in-situ, said composition comprising:
at least one reactive ester having at least one carbon-carbon double bond selected from vinyl esters of versatic acids and vinyl esters of long chain fatty acids;

at least one unsaturated thermoplastic elastomer containing at least one carbon-carbon double bond soluble in the reactive ester;

a solvent;

a coupling agent; and a di- or tri-functional acrylate or methacrylate monomer;

wherein the reactive ester is present in the amount of from 45 to 80 wt percent based on the total weight of the composition.

* * * * *